(12) United States Patent
Shen

(10) Patent No.: US 8,100,548 B2
(45) Date of Patent: Jan. 24, 2012

(54) DIRECT BACKLIGHT MODULE SUPPORTING APPARATUS AND DIRECT BACKLIGHT MODULE

(75) Inventor: Dong-Ming Shen, Suzhou (CN)

(73) Assignees: AU Optronics(Suzhou) Corp., Ltd., Suzhou (CN); AU Optronics Corporation, Hsin-Chu (TW)

( * ) Notice: Subject to any disclaimer, the term of this patent is extended or adjusted under 35 U.S.C. 154(b) by 370 days.

(21) Appl. No.: 12/339,104

(22) Filed: Dec. 19, 2008

(65) Prior Publication Data

US 2010/0073906 A1 Mar. 25, 2010

(30) Foreign Application Priority Data

Sep. 24, 2008 (CN) .......................... 2008 1 0165699

(51) Int. Cl.
*G09F 13/04* (2006.01)
(52) U.S. Cl. ....... 362/97.1; 362/633; 362/382; 362/317; 362/341
(58) Field of Classification Search ........ 362/97.1–97.4, 362/382, 317, 341, 600–634
See application file for complete search history.

(56) References Cited

U.S. PATENT DOCUMENTS

| | | | |
|---|---|---|---|
| 7,059,736 B2 * | 6/2006 | Yu et al. ........................ | 362/97.1 |
| 7,357,535 B2 * | 4/2008 | Tsai et al. ................ | 362/296.07 |
| 7,470,046 B2 * | 12/2008 | Kao et al. ...................... | 362/332 |
| 7,594,747 B2 * | 9/2009 | Tsai et al. ...................... | 362/634 |
| 2004/0012763 A1 * | 1/2004 | Yu et al. ........................ | 353/122 |
| 2004/0228111 A1 * | 11/2004 | Kuo et al. ....................... | 362/31 |
| 2005/0270795 A1 * | 12/2005 | Lai et al. ....................... | 362/558 |
| 2006/0072299 A1 * | 4/2006 | Lai ................................. | 362/29 |
| 2006/0158905 A1 * | 7/2006 | Lai et al. ....................... | 362/634 |

FOREIGN PATENT DOCUMENTS

CN 100416375 C 9/2008

* cited by examiner

*Primary Examiner* — Anabel Ton
*Assistant Examiner* — Danielle Allen
(74) *Attorney, Agent, or Firm* — CKC & Partners Co., Ltd.

(57) ABSTRACT

A direct backlight module supporting apparatus and a direct backlight module are provided. The direct backlight module comprises a backboard, an optical film, at least one light source and at least one direct backlight module supporting apparatus. At least one light source is fixed on the backboard; and at least one direct backlight module supporting apparatus is placed between the backboard and the optical film, wherein the direct backlight module comprises a base and a main body. The base is fixed on the backboard. The main body is a pillar formed on the base. The main body has an opening stretching down from the top of the main body to make a backlight projected to the top of the direct backlight module supporting apparatus. The top of the direct backlight module supporting apparatus supports the optical film.

17 Claims, 4 Drawing Sheets

DIRECT BACKLIGHT MODULE SUPPORTING APPARATUS AND DIRECT BACKLIGHT MODULE

RELATED APPLICATIONS

This application claims priority to China Application Serial Number 200810165699.1, filed Sep. 24, 2008, which is herein incorporated by reference.

BACKGROUND

1. Field of Invention

The present invention relates to a direct backlight module supporting apparatus. More particularly, the present invention relates to a direct backlight module supporting apparatus and a direct backlight module.

2. Description of Related Art

The backlight module illuminates liquid crystal displays. Backlight module designs can be generally classified into two types: direct type and edge type. Large liquid crystal display (LCD) TVs with direct type backlight modules are currently the main focus of development. Direct type backlight modules comprise a plurality of light sources such as light tubes or light emitting diodes (LEDs) integrated into a module, which is then directly disposed underneath a LCD related component (e.g. a LCD panel or an optical film). A plurality of supporting apparatus are formed on the backboard of the backlight module to support the optical film such as a diffuser board. Observe a black point on the display panel is easy if the cross-sectional area of the top of the supporting apparatus is too large. However, if the cross-sectional area of the top of the supporting apparatus is too small, the supporting apparatus may scratch and damage the optical film.

Accordingly, what is needed is a direct backlight module supporting apparatus without generating a black point on the display panel or scratching the optical film to overcome the above issues. The present invention addresses such a need.

SUMMARY

A direct backlight module supporting apparatus is provided. The direct backlight module supporting apparatus comprises a base and a main body which is a pillar formed on the base, wherein the main body has a top opening stretching down from the top of the main body to make a backlight projected to the top of the direct backlight module supporting apparatus through the top opening.

Another object of the present invention is to provide a direct backlight module supporting apparatus. The direct backlight module supporting apparatus comprises a base and a main body which is a pillar formed on the base, wherein the main body comprises a light guiding tunnel having a first opening on the top of the main body and a second opening on a sidewall of the main body to make a backlight from the second opening pass through the light guiding tunnel and make the backlight project to the top of the direct backlight module supporting apparatus through the first opening.

Yet another object of the present invention is to provide a direct backlight module. The direct backlight module comprises a backboard, an optical film, at least one light source fixed on the backboard and at least one direct backlight module supporting apparatus placed between the backboard and the optical film, wherein the direct backlight module supporting apparatus comprises: a base; and a main body which is a pillar formed on the base. The main body has a top opening stretching down from the top of the main body to make a backlight projected to the top of the direct backlight module supporting apparatus through the top opening, the top of the at least one direct backlight module supporting apparatus further supports the optical film.

Another object of the present invention is to provide a direct backlight module. The direct backlight module comprises a backboard, an optical film, at least one light source fixed on the backboard and at least one direct backlight module supporting apparatus placed between the backboard and the optical film, wherein the direct backlight module supporting apparatus comprises: a base; and a main body which is a pillar formed on the base. The main body comprises a light guiding tunnel having a first opening on the top of the main body and a second opening on a sidewall of the main body to make a backlight from the second opening pass through the light guiding tunnel and make the backlight project to the top of the direct backlight module supporting apparatus through the first opening, the top of the at least one direct backlight module supporting apparatus further supports the optical film.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
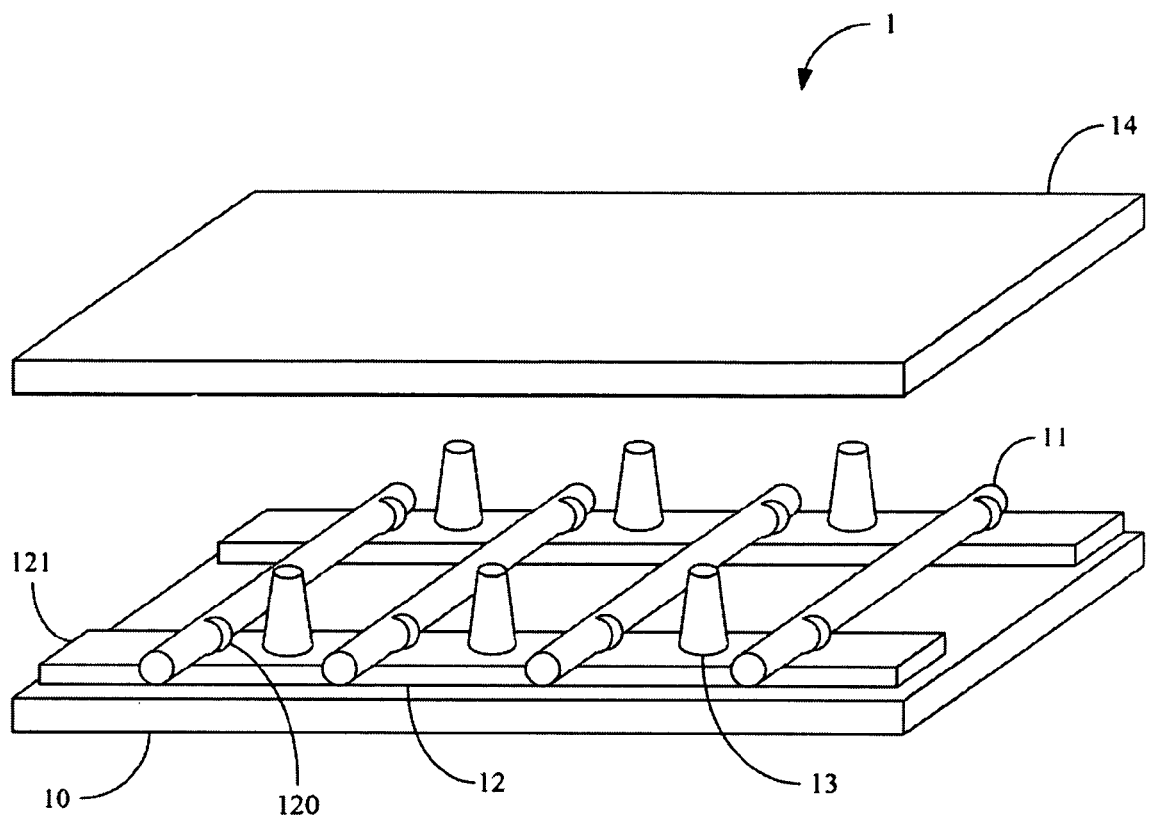
FIG. 1 is an exploded view of the direct backlight module according to the first embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is an exploded view of the direct backlight module 1 according to the first embodiment of the present invention. The direct backlight module 1 comprises a backboard 10, four light sources 11, a plurality of direct backlight module supporting apparatuses 12 and an optical film 14. The direct backlight module supporting apparatuses 12 comprises a base 121 and a plurality of main bodies 13 of the supporting apparatuses 12. The base 121 comprises a fastening structure (not shown) to fasten the base 121 to the backboard 10. In the present embodiment, the light sources 11 are light tubes 11. LEDs or other light-emitting device can be the light sources in other embodiments. The light tube supporting means 120 are fixed on the backboard 10 to support and fix the light tube 11. The light tube supporting means 120 is not an essential element when the light tube is shorter or when the LEDs are used as light sources. In the present embodiment, the light tube support means 120 fastens the two ends of the light tube 11. Each of the supporting apparatuses main bodies 13 is formed on the base 121. In an embodiment, the main bodies 13, the base 121 and the light tube supporting means 120 are one-piece formed. The optical film 14 is on an upper side of the base 121, wherein the top of the supporting apparatuses main bodies supports the optical film 14. In the present embodiment, the optical film 14 is a diffuser board 14. The number of each elements described above is only the condition of the first embodiment as depicted in FIG. 1. It will be readily appreciated by those skilled in the art that modifications may be made to the invention without departing from the concepts disclosed herein. If the size of the backlight module is different, people skilled in the art can easily modify the number of direct backlight module supporting apparatuses, the light sources and the light tube supporting means.

Figure 2A:
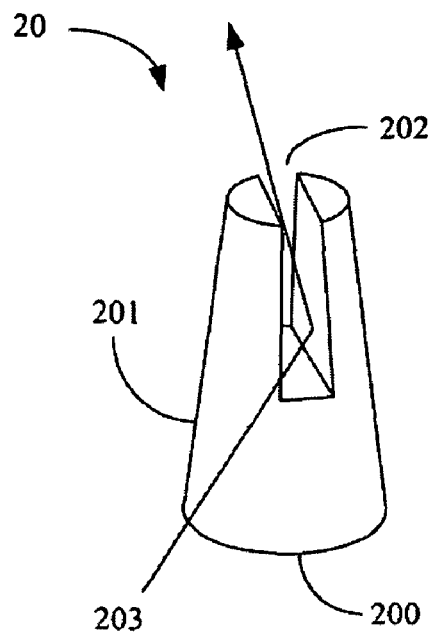
FIG. 2A to FIG. 2G are perspective views and cross-sectional views of the main body of the direct backlight module supporting apparatus in different embodiments.
Figure 2B:
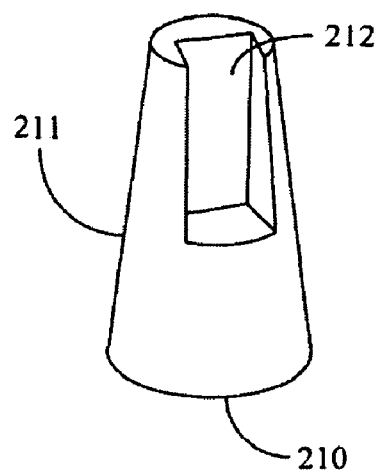
Figure 2C:
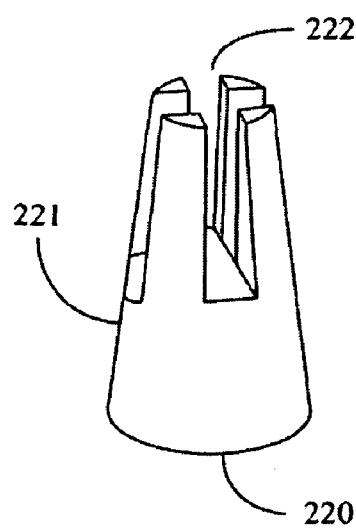

FIG. 2A is a perspective view of the main body 201 of the direct backlight module supporting apparatus 20 in one embodiment. The main body 201 is a pillar on the base (not shown). In the present embodiment, the pillar 201 is a cone-shaped pillar. In other embodiments, the pillar 201 can be a cylinder, a cubic pillar, a pyramid, an inverted pyramid or a pillar with the combination of different shapes (such as a pillar with a cylinder as lower part and a cubic pillar as upper part). The main body 201 has a top opening 202 stretching down from the top of the main body 201 to project the a backlight 203 to the top of the direct backlight module supporting apparatus 20 through the top opening 202. Please refer to FIG. 2B. FIG. 2B is a perspective view of the main body 211 of the direct backlight module supporting apparatus in another embodiment. The difference between the main body 211 in FIG. 2B and the main body 210 in FIG. 2A is that, the top opening 202 of the main body 201 is a cutting opening formed by cutting the top of the main body 201 lengthwise in half, wherein the top opening 212 of the main body 211 is to form a breach by cutting the corner of the top of the main body 211. In another embodiment, as depicted in FIG. 2C, the top opening 222 can be formed by cutting the top of the main body 201 lengthwise in half in a first direction and then cutting the top of the main body 201 lengthwise in half in a second direction to form a cross-shaped top opening 222. The cross-shaped top opening 222 allows more backlight to be projected to the top of the direct backlight module supporting apparatus.

Figure 2D:
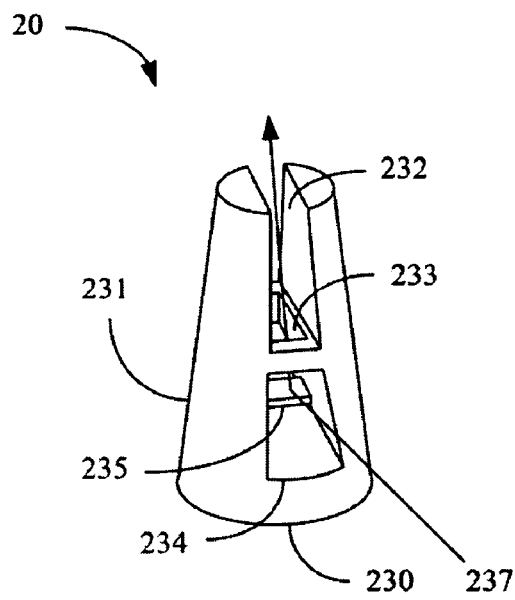
Figure 2E:
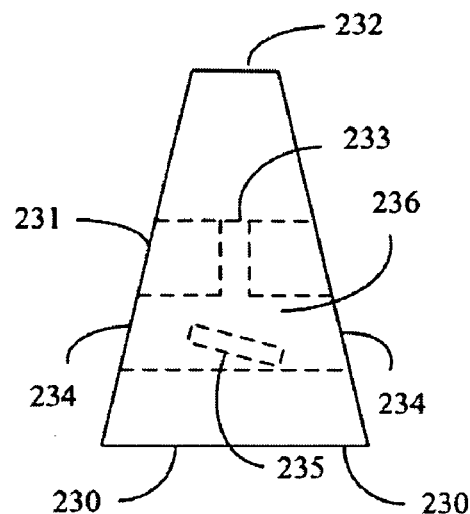
Figure 2F:
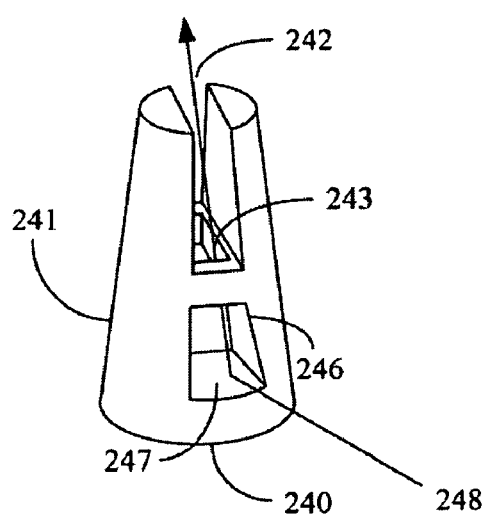
Figure 2G:
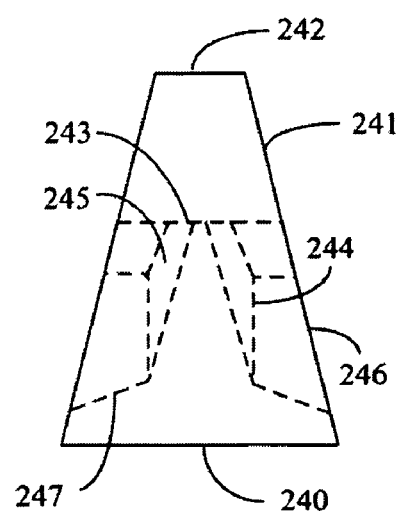

Please refer to FIG. 2D and FIG. 2E at the same time. FIG. 2D is a perspective view of the main body 231 and FIG. 2E is a cross-sectional view of the main body 231. The main body 231 in the present embodiment further comprises a light guiding tunnel 236 having a first opening 233 and a second opening 234. The first opening 233 connects to the top opening 232 and the second opening 234 connects to a sidewall 231 of the main body 231. In the present embodiment, a reflecting means 235 is formed in the light guiding tunnel 236 to reflect the backlight 237 and concentrate the projection of the backlight 237 to the top of the direct backlight module supporting apparatus through the first and the top openings 233 and 232. Please refer to FIG. 2F and FIG. 2G at the same time. FIG. 2F is a perspective view of the main body 241 and FIG. 2G is a cross-sectional view of the main body 241. The main body 241 in the present embodiment comprises a chamfer 246 on the sidewall of the main body 241 and a light guiding tunnel 245. The light guiding tunnel 245 comprises a first opening 243 connected to the top opening 242 and a second opening 244 connected to the chamfer 246. The chamfer 246 further comprises an inclined surface 247 to concentrate the projection of the backlight 248 into the light guiding tunnel 245. The backlight 248 is further projected to the top of the direct backlight module supporting apparatus through the first opening 243 and the top openings 242. It's noticed that, the chamfer and the light guiding tunnel of the main body of the embodiments shown in FIG. 2D and FIG. 2F can also be adapted in the main body shown the FIG. 2B and FIG. 2C.

Figure 3A:
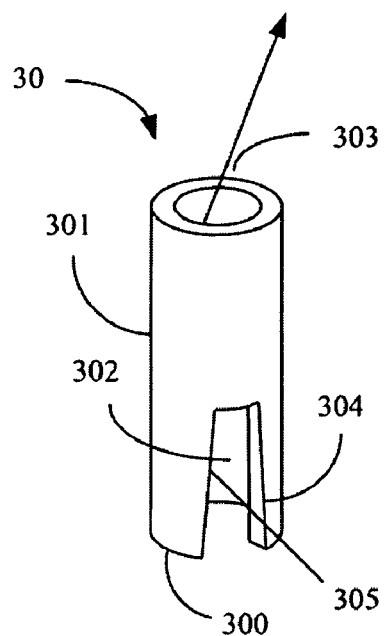
FIG. 3A to FIG. 3D are perspective views and cross-sectional views of the main body of the direct backlight module supporting apparatus in different embodiments.
Figure 3B:
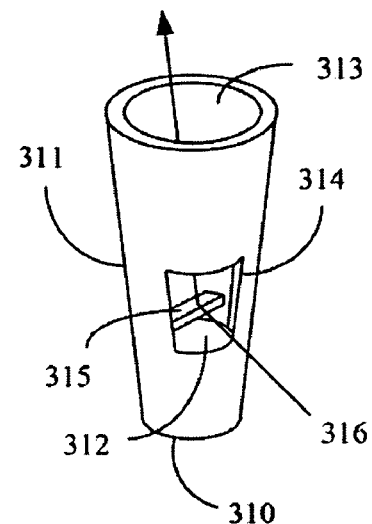
Figure 3C:
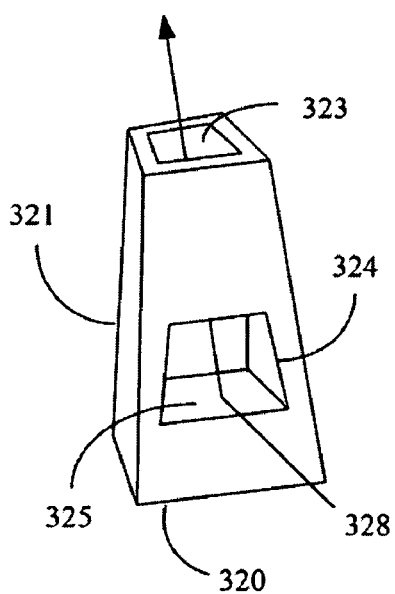
Figure 3D:
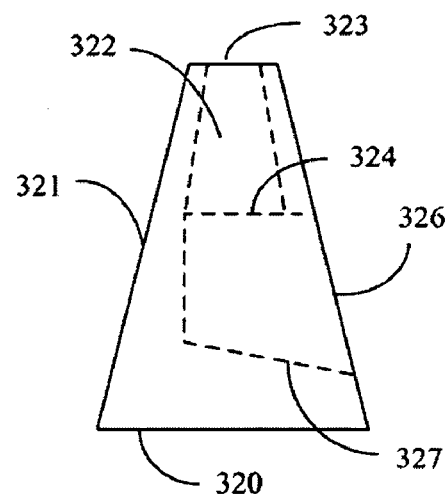

FIG. 3A is a perspective view of the main body 301 of the direct backlight module supporting apparatus 30 in one embodiment. The main body 301 is a cylinder on a base (not shown). In other embodiments, the pillar 301 can be a cylinder, a cubic pillar, a pyramid, an inverted pyramid or a pillar with the combination of different shapes (such as a pillar with a cylinder as lower part and a cubic pillar as upper part). The main body 301 comprises a light guiding tunnel 302 having a first opening 303 on the top of the main body 301 and a second opening 304 on a sidewall of the main body 301 to make a backlight 305 from the second opening 304 pass through the light guiding tunnel 302 and make the backlight 305 project to the top of the direct backlight module supporting apparatus through the first opening 303. FIG. 3B is a perspective view of the main body 311 of the direct backlight module supporting apparatus in one embodiment. The main body 311 in the present embodiment is an inverted cone comprising a light guiding tunnel 312, wherein the light guiding tunnel 312 has a first opening 313 on the top of the main body 311 and a second opening 314 on a sidewall of the main body 311. A reflecting means 315 is formed in the light guiding tunnel 312 to reflect the backlight 316 and concentrate the projection of the backlight 316 to the top of the direct backlight module supporting apparatus through the first openings 313. Please refer to FIG. 3C and FIG. 3D at the same time. FIG. 3C is a perspective view of the main body 321 and FIG. 3D is a cross-sectional view of the main body 321. The main body 321 in the present embodiment is a square pyramid comprising a light guiding tunnel 322 and a chamfer 326 formed on a sidewall of the main body 321. The light guiding tunnel has a first opening 323 connected to the top of the main body 321 and a second opening 324 connected to the chamfer 326. The chamfer 326 further comprises an inclined surface 327 to concentrate the projection of the backlight 328 into the light guiding tunnel 322. The backlight 328 is further projected to the top of the direct backlight module supporting apparatus through the first opening 323.

The direct backlight module supporting apparatus of the present invention provides a supporting mechanism. The design of the top of the main body not only keeps the direct backlight module supporting apparatus from scratching and damaging the optical film it supports because of the larger cross-sectional area, but also makes the backlight projected to the top of the direct backlight module supporting apparatus due to the top opening.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A direct backlight module supporting apparatus comprising:
 a base; and
 a main body which is a pillar formed on the base;
 wherein the main body has a top opening stretching down from the top of the main body such that a backlight is projected to the top of the direct backlight module supporting apparatus through the top opening, and the main body further comprises a chamfer on the sidewall of the main body to reflect the backlight into the light guiding tunnel, wherein the second opening substantially connects to the chamfer.

2. The direct backlight module supporting apparatus of claim 1, wherein the main body further comprises a light guiding tunnel having a first opening connected to the top opening of the main body and a second opening on a sidewall of the main body, the backlight from the second opening passes through the light guiding tunnel and is projected to the top of the direct backlight module supporting apparatus through the first and the top openings.

3. The direct backlight module supporting apparatus of claim 2, wherein a reflecting means is formed in the light guiding tunnel to reflect the backlight and concentrate the projection of the backlight to the top of the direct backlight module supporting apparatus through the first and the top openings.

4. The direct backlight module supporting apparatus of claim 1, wherein the chamfer further comprises an inclined surface to concentrate the projection of the backlight into the light guiding tunnel.

5. The direct backlight module supporting apparatus of claim 1, wherein the main body is a cylinder, a cubic pillar, a pyramid, an inverted pyramid or a pillar with the combination of different shapes.

6. The direct backlight module supporting apparatus of claim 1, wherein the chamfer further comprises an inclined surface to concentrate the projection of the backlight into the light guiding tunnel.

7. A direct backlight module supporting apparatus comprising:
a base; and
a main body which is a pillar formed on the base;
wherein the main body comprises a light guiding tunnel having a first opening on the top of the main body and a second opening on a sidewall of the main body such that a backlight from the second opening passes through the light guiding tunnel and the backlight is projected to the top of the direct backlight module supporting apparatus through the first opening, and the main body further comprises a chamfer on the sidewall of the main body to reflect the backlight into the light guiding tunnel, wherein the second opening substantially connects to the chamfer.

8. The direct backlight module supporting apparatus of claim 7, wherein a reflecting means is formed in the light guiding tunnel to reflect the backlight and concentrate the projection of the backlight to the top of the direct backlight module supporting apparatus through the first openings.

9. The direct backlight module supporting apparatus of claim 7, wherein the main body is a cylinder, a cubic pillar, a pyramid, an inverted pyramid or a pillar with the combination of different shapes.

10. A direct backlight module comprising:
a backboard;
an optical film;
at least one light source fixed on the backboard; and
at least one direct backlight module supporting apparatus in claim 7, placed between the backboard and the optical film.

11. The direct backlight module of claim 10, further comprising at least one light source supporting means fixed on the backboard to connect and fix the at least one light source, wherein the at least one light source supporting means and the at least one direct backlight module supporting apparatus are one-piece formed.

12. A direct backlight module comprising:
a backboard;
an optical film;
at least one light source fixed on the backboard; and
at least one direct backlight module supporting apparatus placed between the backboard and the optical film, wherein the direct backlight module supporting apparatus comprises:
a base; and
a main body which is a pillar formed on the base;
wherein the main body has a top opening stretching down from the top of the main body such that a backlight is projected to the top of the direct backlight module supporting apparatus through the top opening, the top of the at least one direct backlight module supporting apparatus further supports the optical film, and the main body further comprises a chamfer on the sidewall of the main body to reflect the backlight into the light guiding tunnel, wherein the second opening substantially connects to the chamfer.

13. The direct backlight module of claim 12, further comprising at least one light source supporting means fixed on the backboard to connect and fix the at least one light source, wherein the at least one light source supporting means and the at least one direct backlight module supporting apparatus are one-piece formed.

14. The direct backlight module of claim 13, wherein a reflecting means is formed in the light guiding tunnel to reflect the backlight and concentrate the projection of the backlight to the top of the direct backlight module supporting apparatus through the first and the top openings.

15. The direct backlight module of claim 12, wherein the main body further comprises a light guiding tunnel having a first opening connected to the top opening of the main body and a second opening on a sidewall of the main body, the backlight from the second opening passes through the light guiding tunnel and is projected to the top of the direct backlight module supporting apparatus through the first and the top openings.

16. The direct backlight module of claim 12, wherein the chamfer further comprises an inclined surface to make the concentrate the projection of the backlight into the light guiding tunnel.

17. The direct backlight module of claim 12, wherein the main body is a cylinder, a cubic pillar, a pyramid, an inverted pyramid or a pillar with the combination of different shapes.

* * * * *